March 9, 1965 J. SCHALKWIJK 3,173,064
CIRCUIT ARRANGEMENT FOR DETECTING A LOW-FREQUENCY
ALTERNATING CURRENT SIGNAL
Filed March 23, 1960
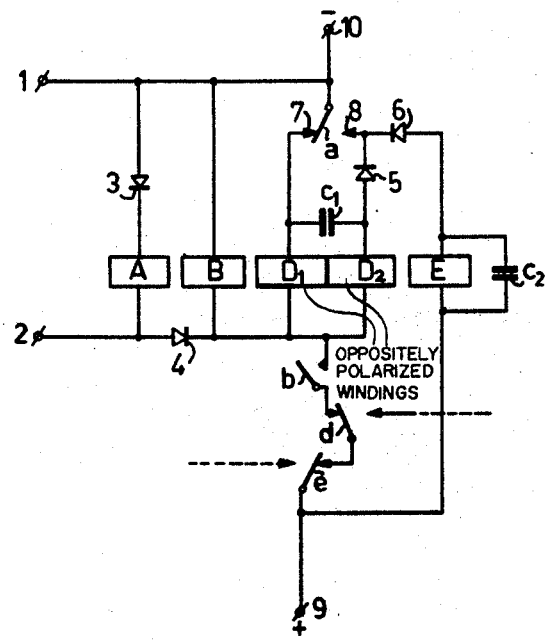
INVENTOR
JAN SCHALKWIJK
BY
AGENT

3,173,064
Patented Mar. 9, 1965

3,173,064
CIRCUIT ARRANGEMENT FOR DETECTING A LOW-FREQUENCY ALTERNATING CURRENT SIGNAL
Jan Schalkwijk, Hilversum, Netherlands, assignor to North American Philips Company, Inc., New York, N.Y., a corporation of Delaware
Filed Mar. 23, 1960, Ser. No. 17,055
Claims priority, application Netherlands, Mar. 25, 1959, 237,529
5 Claims. (Cl. 317—140)

This invention relates to circuit arrangements for detecting a low-frequency alternating current signal (of, for example, 50 c./s.) and for detecting a pulse of approximately the same peak voltage, and also for distinguishing between these two signals. The circuit arrangement comprising the following elements:

(1) A first fast-acting relay having its winding connected to signal input terminals in series with a rectifier which passes the positive half waves of the alternating current signal applied to the input terminals.

(2) A second fast-acting relay having a winding connected to the signal input terminals in series with a rectifier which passes the negative half waves of the alternating current signal.

(3) A relay having two oppositely-connected windings which are directly connected together at one of their ends and the other ends of which are connected together through a capacitor which provides the relay with a retardation substantially greater than half a cycle of the alternating current signal.

(4) A relay bridged by a capacitor and connected in series with a rectifier, which combination provides a retardation of a few cycles of the alternating current signal.

The second fast-acting relay and the relay having two windings are included in a direct-current supply circuit containing in series a make contact of the second fast-acting relay, a break contact of the relay having two windings, and a break contact of the retarded relay, the direct-current circuit for energizing the relay having two windings including, in addition, a change-over contact of the first-fast-acting relay, so that it cannot be energized as long as the alternating current signal is present, and the circuit for energizing the retarded relay including a make contact of the first-fast-acting relay so that energization of the retarded relay detects the presence of the alternating current signal and energization of the relay having two windings detects the pulse. The need for such a circuit arrangement is shown in copending application Serial No. 17,056, filed March 23, 1960, concerning a common telephone line.

In order that the invention may be readily carried into effect, it will now be described in detail, by way of example, with reference to the accompanying drawing, which is a circuit diagram of a detector according to the invention.

In the figure, A and B indicate the windings of two fast-acting relays (for example relays having a retardation of 1 msec.), $D_1$ and $D_2$ indicate the two oppositely polarized windings of the relay having two windings, and E indicates the winding of a relay which is bridged by a capacitor $C_2$. The fast-acting relay A is connected in series with a rectifier 3, for example a diode, to the signal terminals 1 and 2, so that this relay is energized during the positive half waves of the alternating current signal applied to the terminals. The second fast-acting relay B is connected, in series with a second rectifier 4, to the signal terminals 1 and 2 so that this relay is energized only by the negative half waves of the alternating current signal. The windings B, $D_1$ and $D_2$ are included in a direct-current circuit containing in series a make contact $b$ of relay B, a break contact $d$ of relay D, and a break contact $e$ of relay E. In the drawing, it has been assumed that this portion of the direct-current circuit is connected to the positive terminal 9 of a voltage source. Those ends of the windings $D_1$ and $D_2$ which are remote from terminal 9 are connected together through a capacitor $C_1$. This end of winding $D_1$ is also connected to one fixed contact 7 and this end of the winding $D_2$ is also connected through a diode 5 to another fixed contact 8 of a changing contact $a$ of the first fast-acting relay A. The movable contact of changing contact $a$ is connected, as is the signal terminal 1, to the negative terminal 10 of the voltage source. The relay E, which is bridged by capacitor $C_2$, is connected in series with a diode 6 between the terminals 8 and 9.

The circuit arrangement operates as follows. Upon reception of the alternating current signal, the relay A is energized during all the positive half cycles of the alternating current signal. The relay B is energized during the first negative half cycle of the alternating current signal, but then remains energized due to its direct-current circuit closing itself through contact $b$. So long as the circuit receives the alternating current signal, the relay D cannot be energized since changing contact $a$ alternates between fixed contacts 7 and 8 so that the two windings $D_1$ and $D_2$ produce opposite magnetic fields and capacitor $C_1$ is charged in the opposite senses during the successive half cycles of the aternating current. In other words, since the windings $D_1$ and $D_2$ are oppositely connected, application of a transient voltage directly to one winding and by way of capacitor $C_1$ to the other winding will result in substantial balancing of the fields of the two windings until the effect of the transient voltage applied by way of capacitor $C_1$ is reduced. Due to the build up of charge on capacitor $C_2$, after some cycles of the alternating current signal, capacitor $C_2$ becomes sufficiently charged that the relay E is energized, resulting in the common portion of the direct-current circuit of the relays B and D being interrupted at contact $e$. The relay D thus remains at rest and the relay B will be energized and released, as is the relay A, in the frequency of the alternating-current signal. The energization of relay E thus detects the presence of the alternating current signal.

When the circuit arrangement receives a negative pulse, the relay B is energized and keeps energized via its direct-current circuit due to contact $b$ being closed. Since the circuit now does not receive an alternating current signal, the energization of relay B causes retarded energization of relay D. However, the relay E cannot now be energized since changeover contact $a$ remains on fixed contact 7 and thus capacitor $C_2$ cannot be charged by way of diode 6. The energization of relay D thus detects a negative pulse. Due to the retardation of relay E, the circuit can also detect two or three half cycles of the alternating current signal through the energization of relay D.

The diodes serve to separate the direct-current circuits from the alternating-current circuit.

What is claimed is:

1. A circuit for detecting the occurrence of an alternating signal and a pulse and for distinguishing between said signal and pulse comprising first relay means having first and second oppositely connected windings and first normally closed contacts, a source of operating potential having first and second terminals, second relay means having a winding and second normally closed contacts, third normally open contact means, a series circuit connecting one end of each of said first and second windings to said first terminal comprising said first, second and third contacts, means connecting one end of the winding of said second relay means to said first terminal, capacitor means connected between the other ends of said first and second windings, fourth contact means selectively connecting the other ends of said first and second windings to said second terminal, means connecting the other end of the winding of said second relay means to the other end of said second winding, means responsive to an input signal of a first polarity operatively connected to said third contact means, and means responsive to an input signal of a second polarity operatively connected to said fourth contact means.

2. A circuit for detecting the occurrence of an alternating signal and a pulse and for distinguishing between said signal and pulse comprising a source of said signal and pulse, first relay means having first and second oppositely connected windings and first normally closed contacts, a source of operating potential having first and second terminals, second relay means having a winding and second normally closed contacts, third normally open contact means, a series circuit connecting one end of each of said first and second windings to said first terminal comprising said first, second and third contacts, first capacitor means connected between the other ends of said first and second windings, fourth contact means selectively connecting the other ends of said first and second windings to said second terminal, unidirectional current means connecting the winding of said second relay means between said first terminal and the other end of said second winding, second capacitor means connected in parallel with the winding of said second relay means, means connected to said source of said signal and pulse responsive to voltages of a first polarity operatively connected to said third contact means, and means connected to said source of said signal and pulse responsive to voltages of a second polarity operatively connected to said fourth contact means.

3. The circuit of claim 2, in which said other end of said first winding is normally connected to said first terminal.

4. A circuit for detecting the occurrence of an alternating signal and a pulse and for distinguishing between said signal and pulse comprising a source of said signal and pulse, first relay means having first and second oppositely connected windings and first normally closed contacts, a source of operating potential having first and second terminals, second relay means having a winding and second normally closed contacts, third normally open contact means, a series circuit connecting one end of each of said first and second windings to said first terminal comprising said first, second and third contacts, first capacitor means connected between the other ends of said first and second windings, fourth contact means selectively connecting the other ends of said first and second windings to said second terminal, unidirectional current means connecting the winding of said second relay means between said first terminal and the other end of said second winding, second capacitor means connected in parallel with the winding of said second relay means, third and fourth relay means having third and fourth windings respectively, unidirectional current means connecting said third and fourth windings to said source of said signal and pulse for current flow in opposite directions, said third and fourth contact means being operatively connected to said third and fourth relays respectively.

5. The circuit of claim 4, in which said other end of said first winding is normally connected to said first terminal.

References Cited in the file of this patent
UNITED STATES PATENTS

| 1,909,212 | Muehter | May 16, 1933 |
| 2,512,639 | Gohorel | June 27, 1950 |